(12) United States Patent
Winship

(10) Patent No.: US 6,712,402 B2
(45) Date of Patent: Mar. 30, 2004

(54) DOUBLE SHOULDER OILFIELD TUBULAR CONNECTION

(75) Inventor: Thomas Edward Winship, College Station, TX (US)

(73) Assignee: Grant Prideco, L.P., Houston, TX (US)

( * ) Notice: Subject to any disclaimer, the term of this patent is extended or adjusted under 35 U.S.C. 154(b) by 0 days.

(21) Appl. No.: 10/248,971

(22) Filed: Mar. 6, 2003

(65) Prior Publication Data

US 2003/0168851 A1 Sep. 11, 2003

Related U.S. Application Data

(60) Provisional application No. 60/362,900, filed on Mar. 8, 2002.

(51) Int. Cl.$^7$ .............................................. F16L 25/00
(52) U.S. Cl. ......................... 285/333; 285/331; 285/390
(58) Field of Search ........................... 285/357, 89, 55, 285/329, 333, 390, 331

(56) References Cited

U.S. PATENT DOCUMENTS

| | | | | |
|---|---|---|---|---|
| 883,080 A | * | 3/1908 | Bullock | 285/329 |
| 1,738,915 A | * | 12/1929 | Mueller | 285/329 |
| 1,839,676 A | * | 1/1932 | Hicks | 285/330 |
| 2,100,615 A | | 11/1937 | Snell | |
| 2,273,017 A | * | 2/1942 | Boynton | 285/357 |
| 2,938,562 A | * | 5/1960 | Watts et al. | 29/234 |
| 3,167,333 A | * | 1/1965 | Hall et al. | 285/357 |
| 3,172,934 A | * | 3/1965 | Krieg | 285/55 |
| 3,186,738 A | * | 6/1965 | Dalrymple | 285/55 |
| 3,266,821 A | | 8/1966 | Safford | |
| 3,854,760 A | * | 12/1974 | Duret | 285/334 |
| 4,002,359 A | | 1/1977 | Lari | |
| 4,026,583 A | * | 5/1977 | Gottlieb | 285/55 |
| 4,548,432 A | | 10/1985 | Bengstsson | |
| 4,600,219 A | | 7/1986 | Yoshida et al. | |
| 4,629,225 A | | 12/1986 | Rowsey | |
| 4,630,849 A | * | 12/1986 | Fukui et al. | 285/55 |
| 4,647,085 A | | 3/1987 | Anderson et al. | |
| 4,852,655 A | | 8/1989 | Guy | |
| 4,875,713 A | | 10/1989 | Carstensen | |
| 5,549,336 A | | 8/1996 | Hori et al. | |
| 5,908,212 A | | 6/1999 | Smith et al. | |
| 6,042,153 A | * | 3/2000 | DeLange et al. | 285/55 |
| 6,073,332 A | * | 6/2000 | Turner | 285/55 |
| 6,273,474 B1 | * | 8/2001 | Delange et al. | 285/55 |

OTHER PUBLICATIONS

Abstract in English of Soviet patent 941535 and patent document, V.F. Veselov; Screw Joint for Drill Strings, Feb. 25, 1980.
Abstract in English of Japanese patent 2–283993 (A) and patent document; Fujimasa Kamiyama; Coupling Element Pipe for Oil Field Piping with Inside Machined Portion for Deposit Welding; Nov. 21, 1990.

* cited by examiner

Primary Examiner—Eric K. Nicholson
(74) Attorney, Agent, or Firm—Jeffery E. Daly

(57) ABSTRACT

The oilfield tubular pin and box connection includes double shoulders 16, 22. An inner sleeve 18 engages the box at shoulder 20, and provides one of the two shoulders 16, 22 for engaging the pin. The pin bore optionally may be provided with a similar sleeve 24, thereby providing one of the shoulders for engaging the box. The sleeve 18 may be secured to the box shortly after its manufacture, or may be added as a retrofit to an existing box with a single shoulder.

20 Claims, 2 Drawing Sheets

DOUBLE SHOULDER OILFIELD TUBULAR CONNECTION

CROSS REFERENCE TO RELATED APPLICATIONS

The present application claims priority from U.S. Serial No. 60/362,900 filed Mar. 8, 2002, hereby incorporated by reference.

BACKGROUND OF INVENTION

Field of the Invention. The present invention relates to oilfield tubulars and to threaded connection between two oilfield tubulars. More particularly, the invention relates to a threaded oilfield tubular connection with two shoulders.

Background of the Invention. Oilfield tubular members, such as drill-pipe, frequently have a larger ID in the tube section than the ID in the connectors in order to decrease weight and increase flexibility. Accordingly, the tube section may be upset and tool joints with a smaller ID welded to the ends of the tube section. In other applications, it is desirable to form an entire joint from an integral bar for economic and material availability reasons, but since one end has to be a box end for receiving the pin end of another joint, the threaded connection is not able to have a "double shoulder" which provides increased torsional strength.

Oilfield tubular connections with double shoulders are known in the art. U.S. Pat. No. 1,326,643 discloses a double shoulder connection. U.S. Patent illustrates a version of a double shoulder connection. More recent designs for double shoulder connections are disclosed in U.S. Pat. Nos. 5,549,336 and 5,908,212.

The disadvantage of the prior art are overcome by the present invention and an improved oilfield tubular connection is hereinafter disclosed.

SUMMARY OF INVENTION

In a preferred embodiment, the oilfield connection includes a box on one end of a tubular and a pin on the other end of the tubular, with mated threads joining the tubulars.

It is a feature of the invention that a double shoulder connection may be used to retrofit previously manufactured drill string members to provide the double shouldered connection.

A further feature of the invention is that the double shoulder connection may be provided on both the box end and the pin end of the connection, with one sleeve provided in the box and another sleeve provided on the pin.

A further feature of the invention is that the tubular member may be manufactured with two different IDs at its ends: a smaller ID for the pin and a larger ID for the remaining entire length of the joint, including the box.

Another feature of the invention is that the sleeve may be made from either a similar or a dissimilar material as the corresponding pin or box.

Another feature of the invention is that the sleeve may be retained in the box with one of an interference fit, a tapered fit, a threaded connection, or a weldment. The ID of the sleeve preferably approximates the ID of the pin.

These and further features and advantages of the invention will become apparent from the following detailed description, wherein reference is made to the figures in the accompanying drawings.

DETAILED DESCRIPTION

Figure 1:
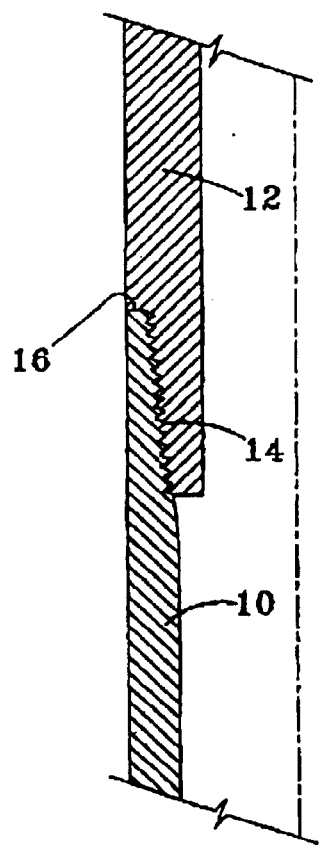
FIG. 1 is a conventional pin and box connection with mated threads.

FIG. 1 shows a conventional box end 10 and a pin end 12 with mated threads 14. Only a single shoulder 16 is provided. According to the present invention, the same box 10 as shown in FIG. 1 may be provided with an inner sleeve 18, which engages the box at shoulder 20, thereby providing the double shoulders 16, 22. Each shoulder preferably lies substantially within a plane perpendicular to a central axis of the connection.

Figure 2:
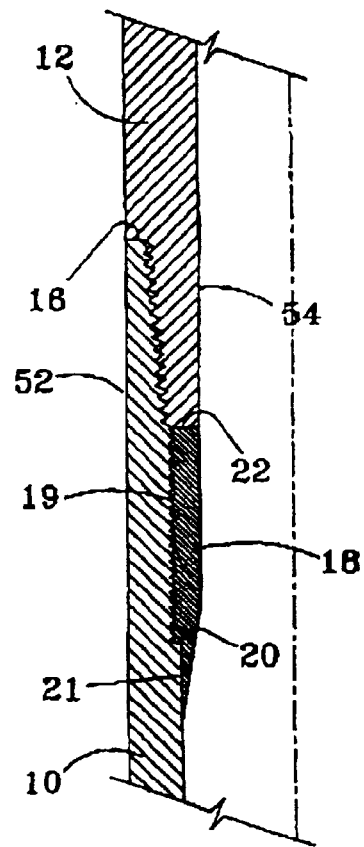
FIG. 2 illustrates a double shoulder pin and box connection according to one embodiment of the invention.

Accordingly, the drill string member may be initially manufactured with two different IDs at its ends, a smaller ID for the pin 12, and a larger ID for the entire remaining length of the joint, including the box 10. Sleeve 18 may be made of a similar or dissimilar material, and may be retained in the box 10 by various techniques, including an interference fit, including a tapered interference fit, a threaded retention, or welding. FIG. 2 illustrates the sleeve 18 secured to the box 10 by threads 19 spaced axially between thread 14 and shoulder 20. The cylindrical outer surface 21 on the sleeve 18 below the shoulder 20 may have a slight interference fit with the mating cylindrical shoulder of the box. The ID of the sleeve 18 preferably approximates the ID of the pin 12, which the OD of the sleeve 18 provides for retention and absorption of loads.

In a preferred embodiment, the box sleeve 18 may be formed from a dissimilar material from that used to fabricate the box end 10, so that the desired characteristics of the box may be met by the selected material for forming a box 10, while the desired characteristics for the sleeve 18 may be met by selecting a different material for the sleeve. In a preferred embodiment, an internal diameter of the box sleeve 18 approximates the internal diameter of the pin 12. Moreover, in a preferred embodiment, each of the first shoulder 16 and the second shoulder 22 has a substantial radial thickness compared to radial thickness of the oilfield connection, so that both shoulder 16, 22 are able to carry a significant portion of the axial load transmitted through the connection. In a preferred embodiment, the radial thickness of the shoulder 16 and the radial thickness of the shoulder 22 are each at least 25% of the radial thickness of the oilfield connection. Accordingly, if the radial thickness between the outer cylindrical surface 52 of the connection as shown in FIG. 2 and the inner cylindrical surface 54 of the pin 12 is approximately 1.6 inches, then the radial thickness of each of the shoulders 16, 22 is preferable at least 0.4 inches, and in many applications, one or both of the shoulders 16, 22 may be about 30% or more of the radial thickness of the connection.

Figure 3:
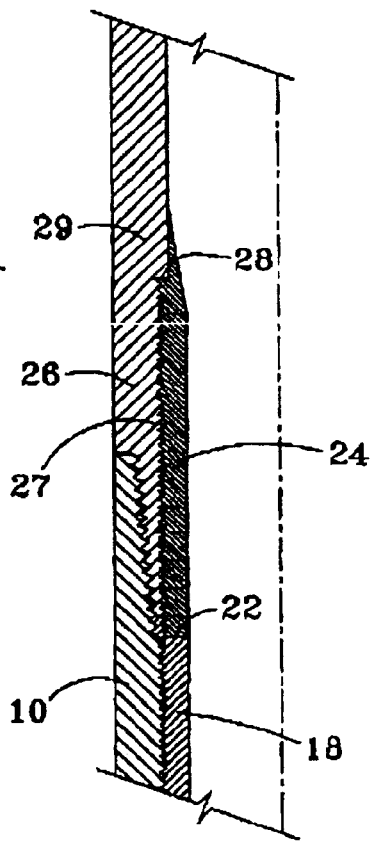
FIG. 3 illustrates a pin provided with a sleeve.

The sleeve 18 as shown in FIG. 2 may be applied by retrofitting drill string members previously manufactured without a double shoulder connection. Also, this same concept may be employed on both the box and pin ends of the connection, in which case the box may be provided with the sleeve 18 as shown in FIG. 2, and the pin bore provided with a similarly shaped sleeve 24, as shown in FIG. 3. More particularly, sleeve 24 engages the pin 12 at shoulder 28. Sleeve 24 may be similarly secured to the pin by threads 27, with outer cylindrical surface 29 engaging the mating cylindrical surface of the pin.

Table A provides characteristics for high performance drill pipe in several sizes according to the present invention, listing dimensions for both the tube and the drill joint.

TABLE A

TUBE

| | TUBE DIMENSIONS | | | MECHANICAL PROPERTIES | |
|---|---|---|---|---|---|
| Nominal Drill Pipe Size, In | Nominal Inside Diameter, In | O.D. of Spiral Upsets, In | Maximum OD of End Upsets, In | Tensile Yield, LB | Torsional Yield, FT-LB |
| 5-1/2 | 4-1/2 | 7 | 5-11/16 | 1,020.973 | 112,745 |
| 5-7/8 | 4-1/2 | 7 | 6 | 1,456,591 | 163,209 |
| 6-5/8 | 5-5/8 | 8-1/2 | 6-15/16 | 1,250,718 | 171,364 |

TOOL JOINT

| | TOOL JOINT DIMENSIONS | | | MECHANICAL PROPERTIES | |
|---|---|---|---|---|---|
| Connection Size, In | Outside Diameter, In | Box Inside Diameter, In | Pin Inside Diameter, In | Tensile Yield, LB | Torsiona Yield, FT LB |
| HT 55 | 7 | 4-1/2 | 3-3/4 | 1,711,745 | 103,645 |
| XT 57 | 7 | 4-1/2 | 4 | 1,658,209 | 125,509 |
| 6-5/8 FH | 8-1/2 | 5-5/8 | 4-1/2 | 2,240,845 | 116,291 |

Figure 4:
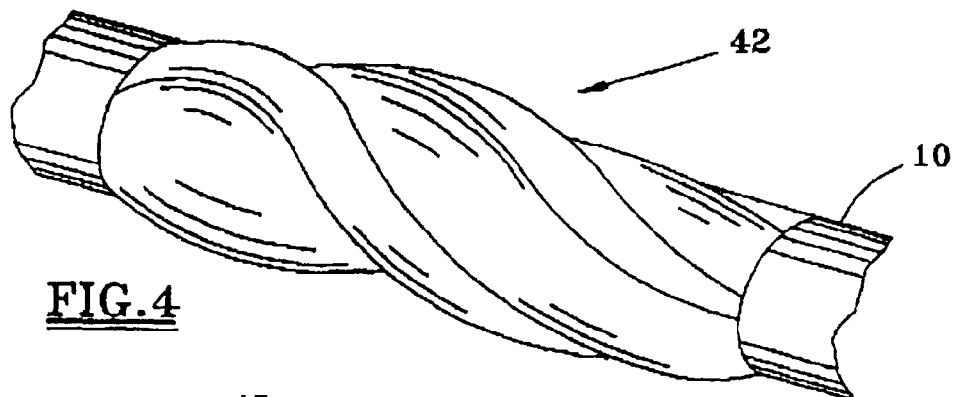
FIG. 4 illustrates a spiral upset section along a drill pipe.
Figures 5, 7, 8:
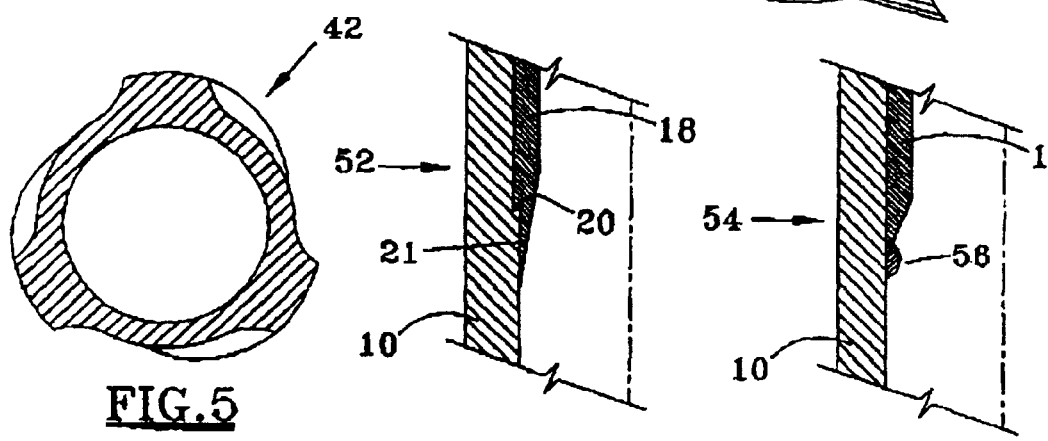
FIG. 5 is a cross-sectional view of the spiral upset shown in FIG. 4.
FIG. 7 illustrates an interference fit connection.
FIG. 8 illustrates a welded connection.
Figure 6:
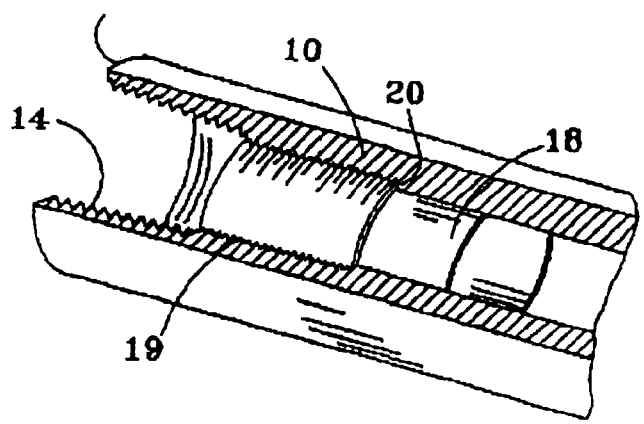
FIG. 6 illustrates the box end, with one-quarter cutaway, and the full sleeve in the box, as shown in FIG. 2.

FIG. 4 illustrates pictorially a spiral upset connection 42, which may be spaced along the one or both of the joints connected by the double shoulder connection discussed above. FIG. 5 is a cross-section of the spiral upset connection. FIG. 6 illustrates the box and sleeve generally shown in FIG. 2.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. An oilfield tubular connection including a threaded pin end on one tubular and a box end with mating threads on another tubular, the pin end having a nominal inside diameter smaller than the box end nominal inside diameter, the connection further comprising:
   the box end having a first torque shoulder formed at the axial end of the box end lying substantially in a plane perpendicular to a central axis of the oilfield tubular connection for engaging a mating surface integrally formed on the pin end, the first torque shoulder being spaced radially outward from the mating threads on the pin end and the box end;
   the pin end having a pin end surface lying substantially in a plane perpendicular to the central axis of the connection; and
   a box sleeve selectively securable to the box end, the box sleeve having a sleeve end surface for matingly engaging the pin end surface to form a second torque shoulder, said box sleeve being wholly received within said connection when said pin and said box end are mated.

2. An oilfield tubular connection as defined in claim 1, wherein the box sleeve includes a box engaging shoulder lying substantially within a plane perpendicular to the central axis of the connection for engagement with the box end to fix an axial position of the box sleeve with respect to the box end.

3. An oilfield tubular connection as defined in claim 1, wherein the box sleeve is threaded to the box end.

4. An oilfield tubular connection as defined in claim 1, wherein the box sleeve is secured to the box end with an interference fit.

5. An oilfield tubular connection as defined in claim 1, wherein the box sleeve is secured to the box end by a weldment.

6. An oilfield tubular connection as defined in claim 1, wherein the sleeve is formed from a dissimilar material than the box.

7. An oilfield tubular connection as defined in claim 1, wherein the internal diameter of the box sleeve box approximates the internal diameter of the pin end.

8. An oilfield tubular connection as defined in claim 1, further comprising:
   a pin sleeve secured to the pin end and within a bore in the pin end, the pin sleeve including the pin end surface thereon.

9. An oilfield tubular connection as defined in claim 8, wherein the pin sleeve includes a pin engaging shoulder for engagement with the pin end to fix an axial position of the pin sleeve with respect to the pin end.

10. An oilfield tubular connection as defined in claim 1, wherein each of the first shoulder and the second shoulder has a radial thickness of at least 25% of the radial thickness of the oilfield connection.

11. An oilfield tubular connection as defined in claim 1, wherein the one and the another tubular members are each drill pipe having a larger internal diameter for a tube section and a smaller internal diameter in the pin end.

12. An oilfield tubular connection as defined in claim 1, further comprising:
   a spiral upset portion along the length of at least one of one tubular and another tubular.

13. An oilfield tubular connection including a threaded pin end on one tubular and a box end with mating threads on another tubular, the pin end having a nominal inside diameter smaller than the box end nominal inside diameter, the connection further comprising:
   the box end having a first torque shoulder formed at the axial end of the box end lying substantially in a plane perpendicular to a central axis of the oilfield tubular connection for engaging a mating surface integrally formed on the pin end, the first torque shoulder being spaced radially outward from the mating threads on the pin end and the box end;
   the pin end having a pin end surface lying substantially in a plane perpendicular to the central axis of the connection;
   a box sleeve selectively securable to the box end, the box sleeve having a sleeve end surface for matingly engaging the pin end surface to form a second torque shoulder, said box sleeve being wholly received within said connection when said pin end and said box end are mated, and
   each of the first shoulder and the second shoulder has a radial thickness of at least 25% of the radial thickness of the oilfield connection.

14. An oilfield tubular connection as defined in claim 13, wherein the sleeve is formed from a dissimilar material than the box.

15. An oilfield tubular connection as defined in claim 13, further comprising:

a pin sleeve secured to the pin end and within a bore in the pin end, the pin sleeve including the pin end surface thereon.

16. A method of forming an oilfield tubular connection including a threaded pin end on one tubular and a box end with mating threads on another tubular, the pin end having a nominal inside diameter smaller than the box end nominal inside diameter, the method comprising:

forming the box end with a first torque shoulder formed at the axial end of the box end lying substantially in a plane perpendicular to a central axis of the oilfield tubular connection for engaging a mating surface integrally formed on the pin end, the first torque shoulder being spaced radially outward from the mating threads on the pin end and the box end;

forming the pin end with a pin end surface lying substantially in a plane perpendicular to the central axis of the connection;

securing a box sleeve to the box end, the box sleeve having a sleeve end surface for matingly engaging the pin end surface to form a second torque shoulder, said box sleeve being wholly received within said connection when said pin end and said box end are mated; and each of the first shoulder and the second shoulder has a radial thickness of at least 25% of the radial thickness of the oilfield connection.

17. A method of forming an oilfield tubular connection as defined in claim 16, wherein the box sleeve includes a box engaging shoulder lying substantially within a plane perpendicular to the central axis of the connection for engagement with the box end to fix an axial position of the box sleeve with respect to the box end.

18. A method of forming an oilfield tubular connection as defined in claim 16, wherein the sleeve is formed from a dissimilar material than the box.

19. A method of forming an oilfield tubular connection as defined in claim 16, wherein internal diameter of the sleeve approximates the internal diameter of the pin end.

20. A method of forming an oilfield tubular connection as defined in claim 16, further comprising:

securing a pin sleeve to the pin end and within a bore in the pin end, the pin sleeve including the pin end surface thereon.

\* \* \* \* \*